US011831872B2

(12) United States Patent
Naser et al.

(10) Patent No.: US 11,831,872 B2
(45) Date of Patent: Nov. 28, 2023

(54) VIDEO ENCODING AND DECODING USING MULTIPLE TRANSFORM SELECTION

(71) Applicant: InterDigital Madison Patent Holdings, SAS, Paris (FR)

(72) Inventors: Karam Naser, Mouaze (FR); Franck Galpin, Thorigne-Fouillard (FR); Gagan Rath, Bhubaneswar (IN)

(73) Assignee: InterDigital Madison Patent Holdings, SAS, Paris (FR)

( * ) Notice: Subject to any disclaimer, the term of this patent is extended or adjusted under 35 U.S.C. 154(b) by 35 days.

(21) Appl. No.: 17/288,378

(22) PCT Filed: Oct. 25, 2019

(86) PCT No.: PCT/US2019/057983
§ 371 (c)(1),
(2) Date: Apr. 23, 2021

(87) PCT Pub. No.: WO2020/092137
PCT Pub. Date: May 7, 2020

(65) Prior Publication Data
US 2021/0385452 A1    Dec. 9, 2021

(30) Foreign Application Priority Data

Nov. 1, 2018  (EP) ..................................... 18290128
Aug. 21, 2019 (EP) ..................................... 19306025

(51) Int. Cl.
*H04N 19/12* (2014.01)
*H04N 19/176* (2014.01)
*H04N 19/61* (2014.01)

(52) U.S. Cl.
CPC ........... *H04N 19/12* (2014.11); *H04N 19/176* (2014.11); *H04N 19/61* (2014.11)

(58) Field of Classification Search
None
See application file for complete search history.

(56) References Cited

U.S. PATENT DOCUMENTS 10,194,158 B2   1/2019   Karczewicz et al.
11,039,139 B2 *  6/2021   Zhao ..................... H04N 19/176
(Continued)

OTHER PUBLICATIONS

"CE6-related: MTS with Haar transform for Screen Contents Coding"; 13. JVET Meeting; Jan. 9, 2019-Jan. 18, 2019; Marrakech; (The Joint Video Exploration Team of ISO/IEC JTC1/SC29/WG11 and ITU-T SG.16 ) No. JVET-M0354; Jan. 13, 2019.
(Continued)

*Primary Examiner* — Jessica M Prince
(74) *Attorney, Agent, or Firm* — CONDO ROCCIA KOPTIW LLP

(57) ABSTRACT

In general, encoding or decoding image information can involve processing a signal including image information based on determining a block of spatial-domain values for a prediction residual; replacing in a set of multiple transforms at least one first transform matrix with at least one second transform matrix and/or adding at least one second transform matrix to said set of multiple transforms; transforming the block of spatial-domain values using said second transform matrix; and encoding or decoding at least a portion of the image information based on the transforming of the block of spatial-domain values.

32 Claims, 14 Drawing Sheets

(56) References Cited

U.S. PATENT DOCUMENTS

| | | | |
|---|---|---|---|
| 2010/0014590 A1* | 1/2010 | Smith | H04N 19/63 |
| | | | 375/240.19 |
| 2010/0086049 A1* | 4/2010 | Ye | H04N 19/61 |
| | | | 375/E7.123 |
| 2011/0211636 A1* | 9/2011 | Yamada | H04N 19/61 |
| | | | 375/240.18 |
| 2018/0020218 A1* | 1/2018 | Zhao | H04N 19/124 |
| 2021/0203969 A1* | 7/2021 | Salehifar | H04N 19/176 |

OTHER PUBLICATIONS

Kang, Je-Won, "Sample selective filter in HEVC intra-prediction for screen content video coding", Electronic Letters, Feb. 5, 2015, vol. 51, No. 3, pp. 236-237.

Zhao, Xin, et al., "CE6-related: Unification of Transform Skip mode and MTS (JVET-L0289)" Slides, Oct. 2018, 6 pages.

Zhao, Xin, et al., "CE6-related: Unification of Transform Skip mode and MTS", JVET of ITU-T SG16 WP3 and ISO/IEC JTC 1/SC29WG/11, 12th Meeting: Macao, CN, Oct. 3-12, 2018, Document: JVET-L0289, 8 pages.

Chen, Cheng, et al., "A Staircase Transform Coding Scheme for Screen Content Video Coding", WebM Codec Team, Google Inc., 2016 IEEE, 2365-2369 pages.

De-Luxán-Hernández et al., "Block Adaptive Selection of Multiple Core Transforms for Video Coding" 2016 Picture Coding Symposium (PCS), Dec. 2016, 5 pages, IEEE, Nuremberg, Germany.

Masera, Maurizio, et al., "Adaptive Approximated DCT Architectures for Hevc", IEEE Transactions on Circuits and Systems for Video Technology, vol. 27, Issue: 12, Dec. 2017, pp. 2714-2725.

Chen et at., "Algorithm Description of Joint Exploration Test Model 6 (JEM6)", Joint Video Exploration Team (JVET) of ITU-T SG WP 3 and ISO/IEC JTC 1/SC 29/WG 11, 6th Meeting, Hobart, AU, Mar. 31-Apr. 7, 2017, JVET-F1001-v3.

* cited by examiner

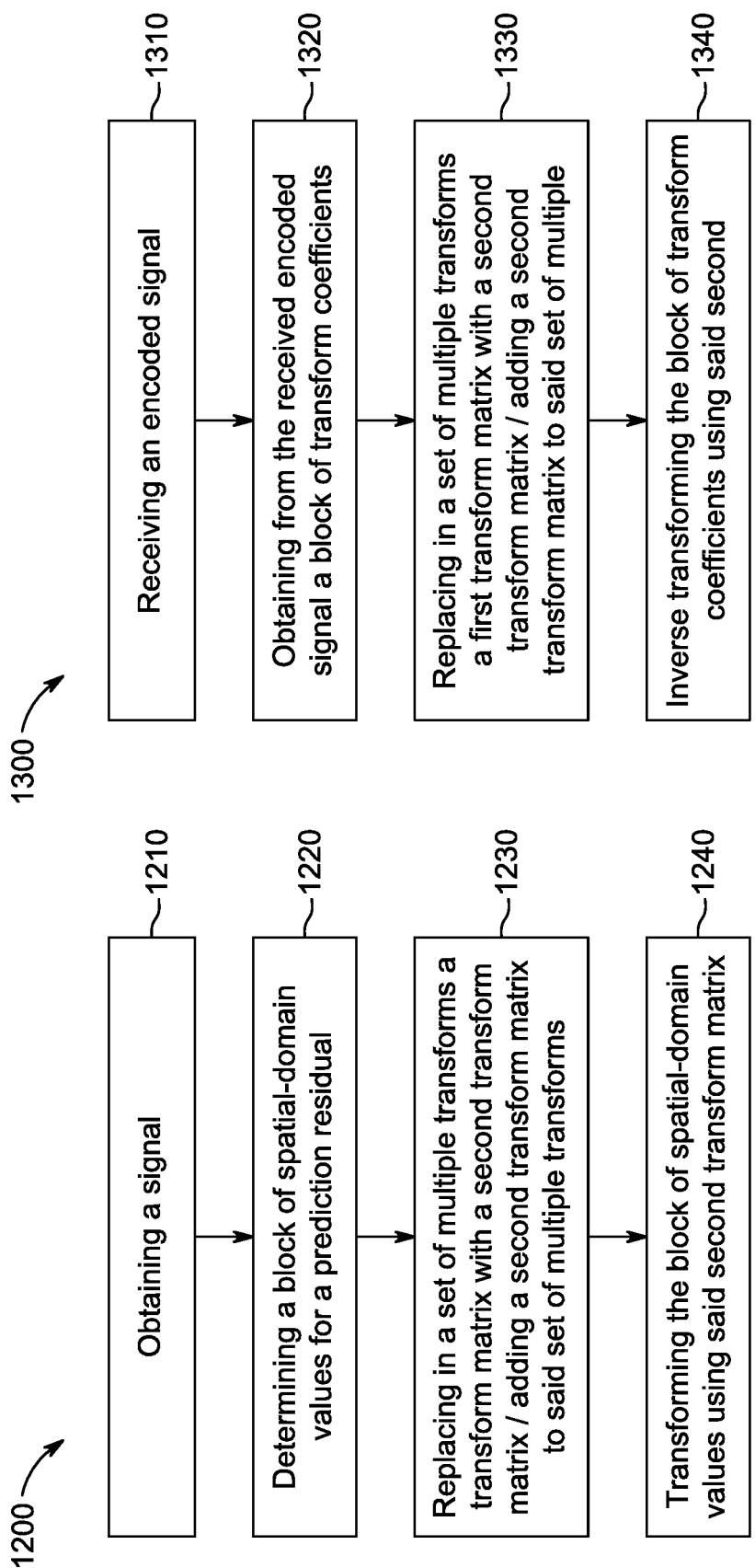

VIDEO ENCODING AND DECODING USING MULTIPLE TRANSFORM SELECTION

CROSS REFERENCE TO RELATED APPLICATIONS

This application is the National Stage Entry under 35 U.S.C. § 371 of Patent Cooperation Treaty Application No. PCT/US2019/057983, filed Oct. 25, 2019, which claims priority from European Application No. 18290128.0, filed Nov. 1, 2018, and European Application 19306025.8, filed Aug. 21, 2019, the contents of each of which are hereby incorporated by reference herein in their entireties.

TECHNICAL FIELD

The present embodiments generally relate to encoding and decoding, and more particularly, to video encoding and decoding video using multiple transform selection (MTS) for transform coding.

BACKGROUND

To achieve high compression efficiency, image and video coding schemes usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding.

Recent additions to video compression technology include various versions of the reference software and/or documentations Joint Exploration Model (JEM) being developed by the Joint Video Exploration Team (JVET). The aim of JEM is to make further improvements to the existing HEVC (High Efficiency Video Coding) standard.

SUMMARY

According to a general aspect of at least one embodiment, a method for encoding is presented, comprising obtaining a signal; determining a block of spatial-domain values for a prediction residual; replacing in a set of multiple transforms at least one first transform matrix with at least one second transform matrix and/or adding at least one second transform matrix to said set of multiple transforms; and transforming the block of spatial-domain values using said second transform matrix.

According to another general aspect of at least one embodiment, a method for decoding is presented comprising receiving an encoded signal; obtaining from the received encoded signal a block of transform coefficients; replacing in a set of multiple transforms at least one first transform matrix with at least one second transform matrix and/or adding at least one second transform matrix to said set of multiple transforms; and inverse transforming the block of transform coefficients using said second transform matrix.

According to a general aspect of at least one embodiment, an apparatus for encoding is presented, comprising one or more processors configured to obtain a signal; determine a block of spatial-domain values for a prediction residual; replace in a set of multiple transforms at least one first transform matrix with at least one second transform matrix and/or add at least one second transform matrix to said set of multiple transforms; and transform the block of spatial-domain values using said second transform matrix.

According to another general aspect of at least one embodiment, an apparatus for decoding is presented comprising one or more processors configured to receive an encoded signal; obtain from the received encoded signal a block of transform coefficients; replace in a set of multiple transforms at least one first transform with at least one second transform matrix and/or add at least one second transform matrix to said set of multiple transforms; and inverse transform the block of transform coefficients using said second transform matrix.

According to another general aspect of at least one embodiment, a signal comprising data generated according to the method or the apparatus of any of the preceding descriptions is presented.

One or more of the present embodiments also provide a computer readable storage medium having stored thereon instructions for encoding or decoding data according to the methods described above.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

The present disclosure may be better understood by consideration of the detailed description below in conjunction with the accompanying figures, in which:

FIG. 18 illustrates a coding method according to an embodiment of the present disclosure.

FIG. 19 illustrates a decoding method according to an embodiment of the present disclosure.

It should be understood that the drawings are for purposes of illustrating examples of various aspects and embodiments and are not necessarily the only possible configurations.

Throughout the various figures, like reference designators refer to the same or similar features.

DETAILED DESCRIPTION

Figure 1:
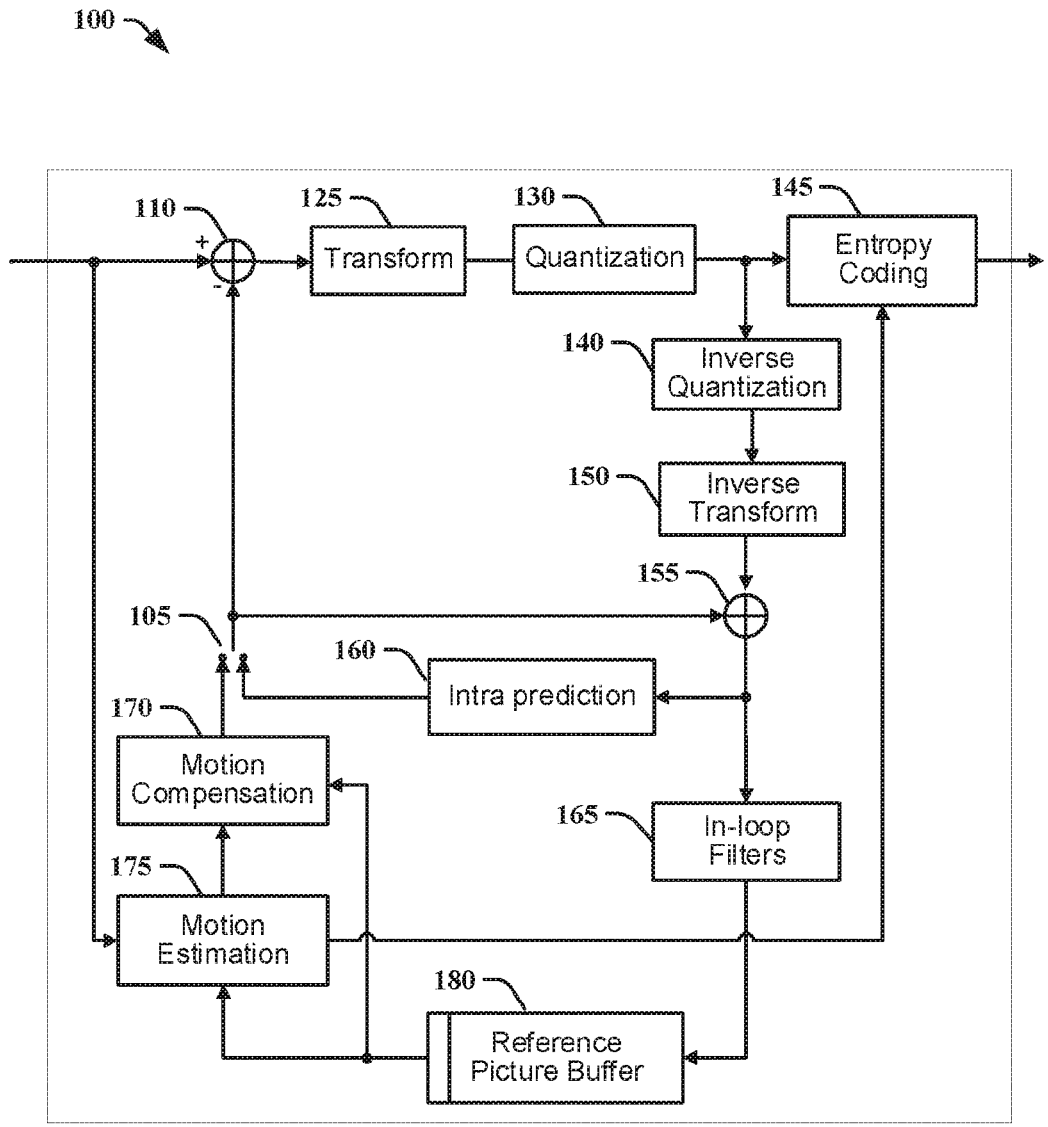
FIG. 1 illustrates a block diagram of an exemplary video encoder.

Turning now to the figures, FIG. 1 illustrates an exemplary video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU.

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

Figure 3A:
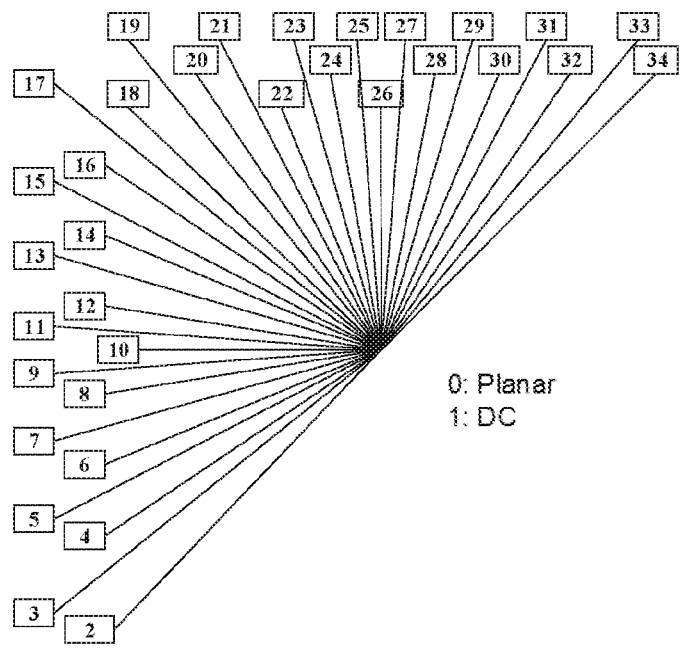
FIG. 3A is a pictorial example depicting intra prediction directions and corresponding modes in HEVC.

CUs in intra mode are predicted from reconstructed neighboring samples within the same slice. A set of 35 intra prediction modes is available in HEVC, including a DC, a planar, and 33 angular prediction modes as shown in FIG. 3A. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options in HEVC. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

Figure 3B:
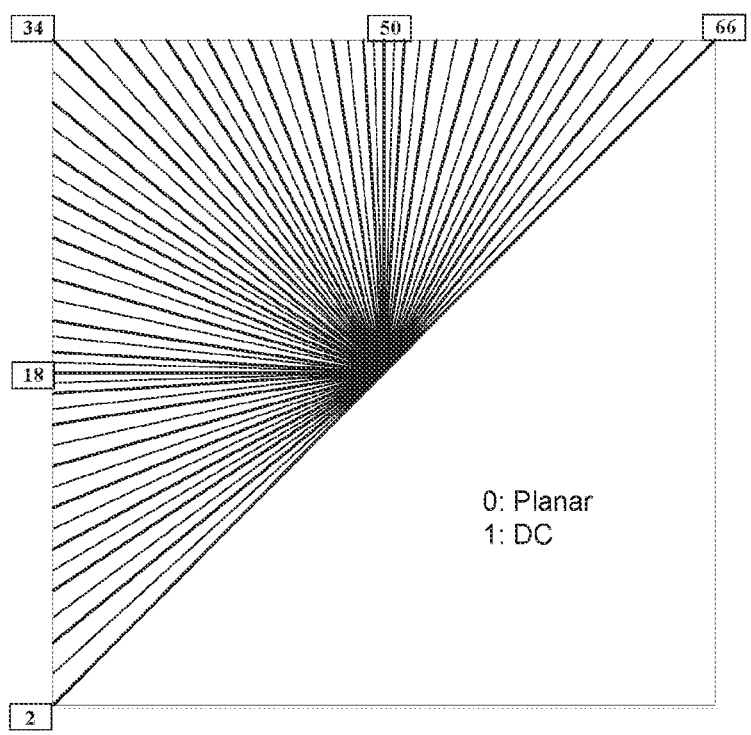
FIG. 3B is a pictorial example depicting intra prediction directions and corresponding modes in JEM

Current proposals in JEM increase the number of the intra prediction modes compared with HEVC. For example, as shown in FIG. 3B, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34 as shown in FIG. 3A. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of finer angular structures with proposed larger block sizes.

For an inter CU in HEVC, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The transforms are generally based on separable transforms. For instance, a DCT transform is first applied in the horizontal direction, then in the vertical direction. For HEVC, transform block sizes of 4×4, 8×8, 16×16, and 32×32 are supported. The elements of the core transform matrices were derived by approximating scaled discrete cosine transform (DCT) basis functions. The HEVC transforms are designed under considerations such as limiting the dynamic range for transform computation and maximizing the precision and closeness to orthogonality when the matrix entries are specified as integer values. For simplicity, only one integer matrix for the length of 32 points is specified, and subsampled versions are used for other sizes. For the transform block size of 4×4, an alternative integer transform derived from a discrete sine transform (DST) is applied to the luma residual blocks for intra prediction modes.

In JEM, the transforms used in both directions may differ (e.g., DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
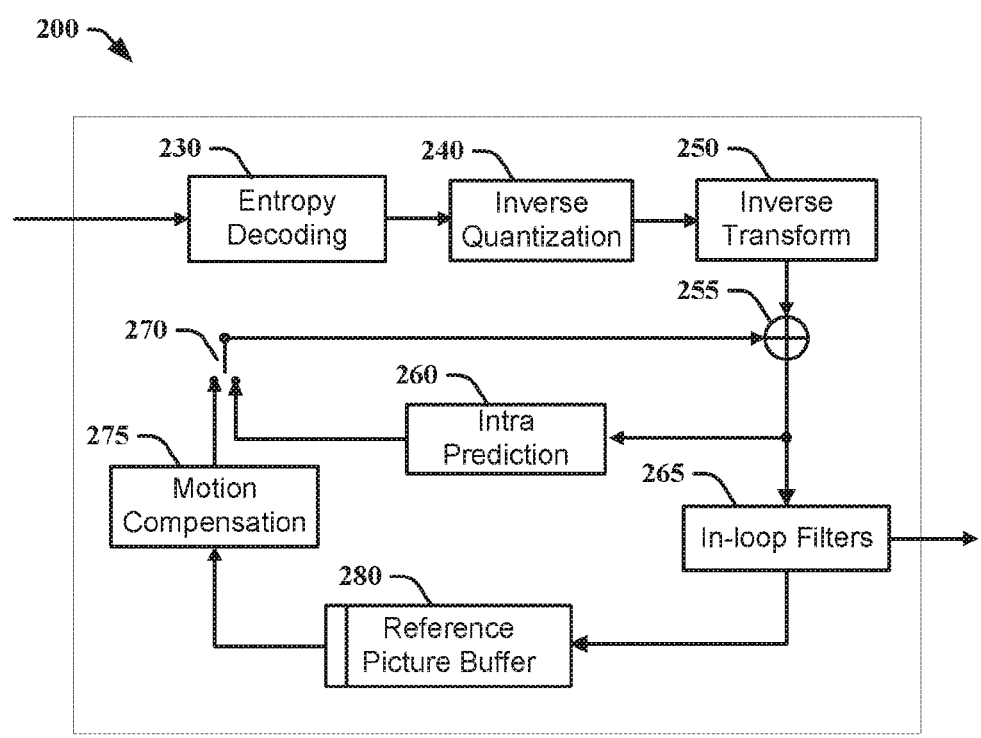
FIG. 2 illustrates a block diagram of an exemplary video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. For HEVC, the picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. For JEM, the decoder may divide the picture based on the partitioning information indicating the QTBT structure. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 4:
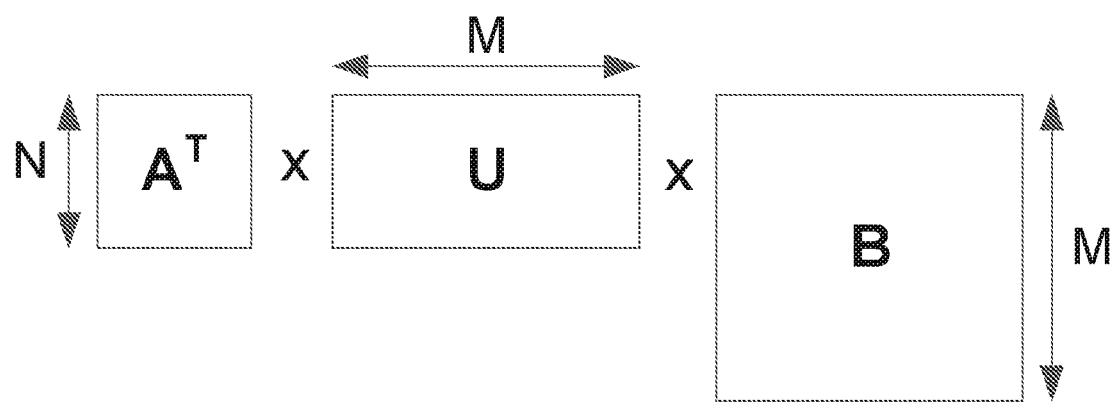
FIG. 4 is an illustration of a 2D transformation of a residual M×N block U by a 2D M×N transform.

As described above, the prediction residuals are transformed and quantized. For the transformation of the prediction residuals, considering an M×N (M columns×N rows) residual block ($[U]_{M \times N}$) that is input to a 2D M×N forward transform, the 2D transform is typically implemented by applying an N-point 1D transform to each column (i.e., vertical transform) and an M-point 1D transform to each row (i.e., horizontal transform) separately, as illustrated in FIG. 4. Mathematically, the forward transform can be expressed as:

$$[C]_{M \times N} = [A]^T_{N \times N} \times [U]_{M \times N} \times [B]_{M \times M}$$

where $[A]_{N \times N}$ is the N-point transform matrix applied vertically, and $[B]_{M \times M}$ the M-point transform matrix applied horizontally, and "T" (superscript) is the matrix transposition operator. Thus, the separable transform consists in applying the horizontal and vertical transforms successively on each row and each column of the 2D prediction residual block. The inverse 2D M×N transform is thus expressed as follows:

$$[U]_{M \times N} = [A^{-1}]^T_{N \times N} \times [C]_{M \times N} \times [B^{-1}]_{M \times M}$$

For orthogonal transforms A and B, $[A^{-1}] = [A]^T$, and $[B^{-1}] = [B]^T$. Thus, the inverse transform can also be written as:

$$[U]_{M \times N} = [A]_{N \times N} \times [C]_{M \times N} \times [B]^T_{M \times M}$$

Some video codecs, such as those conforming to HEVC when processing certain block sizes, are based on 2D separable transforms using the same vertical and horizontal 1D transforms. In the case of HEVC, DCT-II is used as the core transform. DCT-II transform is employed as a core transform mainly due to its ability to approximate Karhunen Loeve Transform (KLT) for highly correlated data. In addition, DCT-II is based on mirror extension of the discrete Fourier transform that has a fast implementation (known as Fast Fourier Transform or FFT). This property enables fast implementation of DCT-II, which is desired for both the hardware and software design.

However, in the current JEM, five different horizontal/vertical transforms are defined, derived from five transforms as shown in Table 1 and illustrated for 4×4 size in FIG. 4. Flags are used at the CU level, for sizes from 4×4 to 64×64, to control the combination of transforms. When the CU level flag is equal to 0, DCT-II is applied as the horizontal and vertical transforms. When the CU level flag is equal to 1, two additional syntax elements are signalled to identify which one(s) of DCT-V, DCT-VIII, DST-I and DST-VII are to be used for the horizontal and vertical transforms. Note that other horizontal/vertical transforms could also be considered, such as the identity transform (which corresponds to skipping the transform in one direction).

TABLE 1

Transform basis functions of DCT-II/V/VIII and DST-I/VII for N-point input in JEM.

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$, where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

For the intra case, the set of possible transforms depends on the intra mode. Three sets are defined as follows:
Set 0: DST-VII, DCT-VIII
Set 1: DST-VII, DST-I
Set 2: DST-VII, DCT-V
For each intra mode and each transform direction (horizontal/vertical), one of these three sets is enabled. For each of the horizontal and vertical transform, one of the two transform candidates in the identified transform subset, is selected based on explicitly signaled flags. For the inter case, only DST-VII and DCT-VIII are enabled, and the same transform is applied for both horizontal and vertical transforms.

In the following, some arrangements are described mainly with respect to intra-predicted blocks, but the techniques may also be applied to inter-predicted blocks.

As used herein, regular numbers are used interchangeably with roman numerals for brevity. Therefore, for example, DCT-II, DCT-V, DCT-VIII, DST-I, DST-IV and DST-VII are also referred respectively as DCT2, DCT5, DCT8, DST1, DST4 and DST7.

Figure 13:
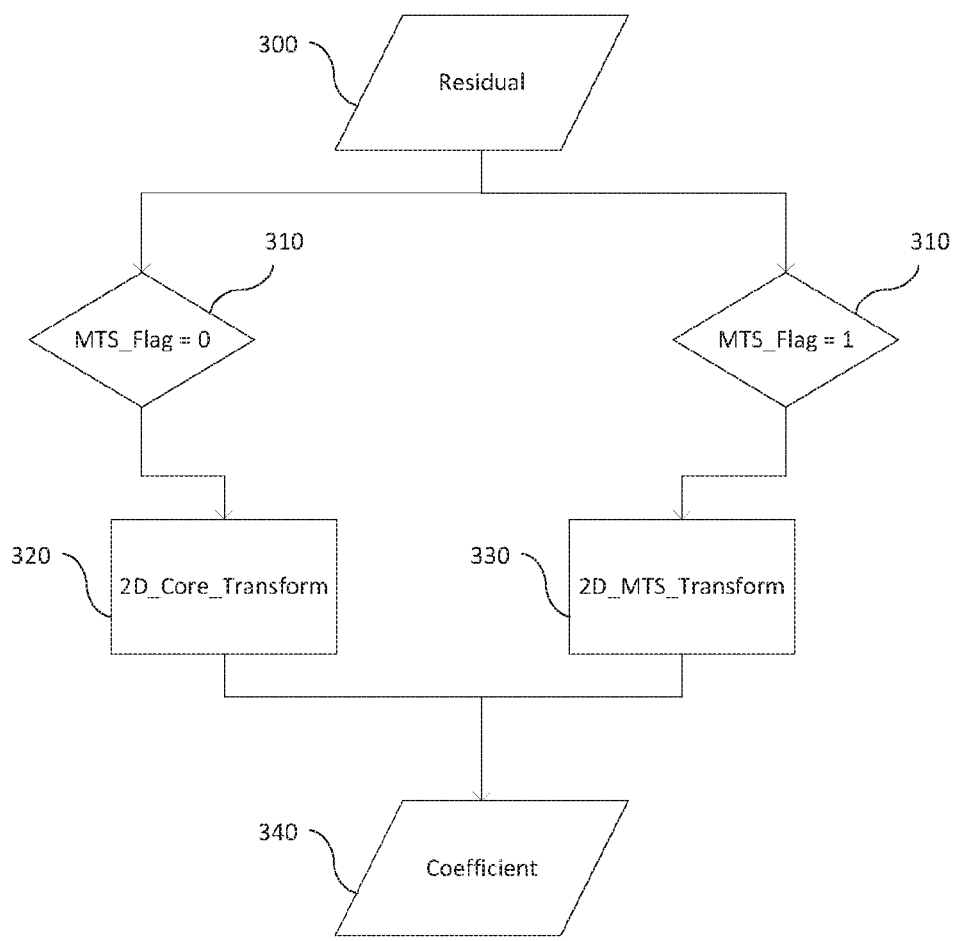
FIG. 13 illustrates a default transform design with a default core transform and a multiple transform selection of additional transforms.

FIG. 13 illustrates an example of a transform design. The example in FIG. 13 corresponds to the default transform design of VTM (VVC test model). In FIG. 13, the core transform is DCT2 and MTS contains DST7/DCT8. For a residual signal received as an input in step 300 a syntax element MTS-Flag specifies whether the core transform or a MTS transform is selected for the transformation. If in step 310 the value of the MTS-Flag is determined to be equal to "0", the DCT2 core transform is applied in step 320 to the residual signal. On the other hand, if in step 310 the value of the MTS-Flag is determined to be equal to "1", a MTS transform is applied in step 330. The resulting transform coefficients are output in step 340 for further processing such as quantization and entropy coding.

According to at least one aspect of the present disclosure, at least one embodiment involves so-called screen content. Screen content is a special type of content where the characteristics of images and image sequences are relatively distinguished by constant values and sharp edges. In particular, screen content corresponds at least partially to computer-generated objects such as graphics, text, or animation, i.e. to non-camera-captured image content. The statistical properties of the residual signal are thus expected to be different from the typical residual signal of typical camera captured image content. Correspondingly, the default core transform of DCT2 and/or the additional transforms in the multiple transform selection (MTS) are not suitable for compacting such type of residual. In accordance with another aspect, various examples of embodiments involve one or more sets of transforms adapted to screen content residuals.

Typically, as discussed above, the DCT2 transform is the core transform for video compression. Additionally, other transforms like DCT8 and DST7 are used in MTS to capture the characteristics of the residual signal. An aspect of at least one embodiment can involve replacing some or all of these transforms by other transforms that have one or more characteristics adapted for processing content such as screen contents. For example, such characteristics may comprise one or more discontinuities and/or constant increase/decrease in their basis functions. Examples of such other or alternative transforms are (Haar Transform, Walsh-Hadamard Transform and Slant Transform). In addition, identity transform can also be used as it is the one with complete discontinuity that can be especially useful when combined with other in 2D transforms.

The un-normalized Haar and Walsh-Hadamard transform matrix elements are either ±1 or zeros, for which simple addition and subtractions are used to compute the transform. On the other hand, the Slant transform is a transform with a constant increase/decrease and discontinuities.

Figure 5:
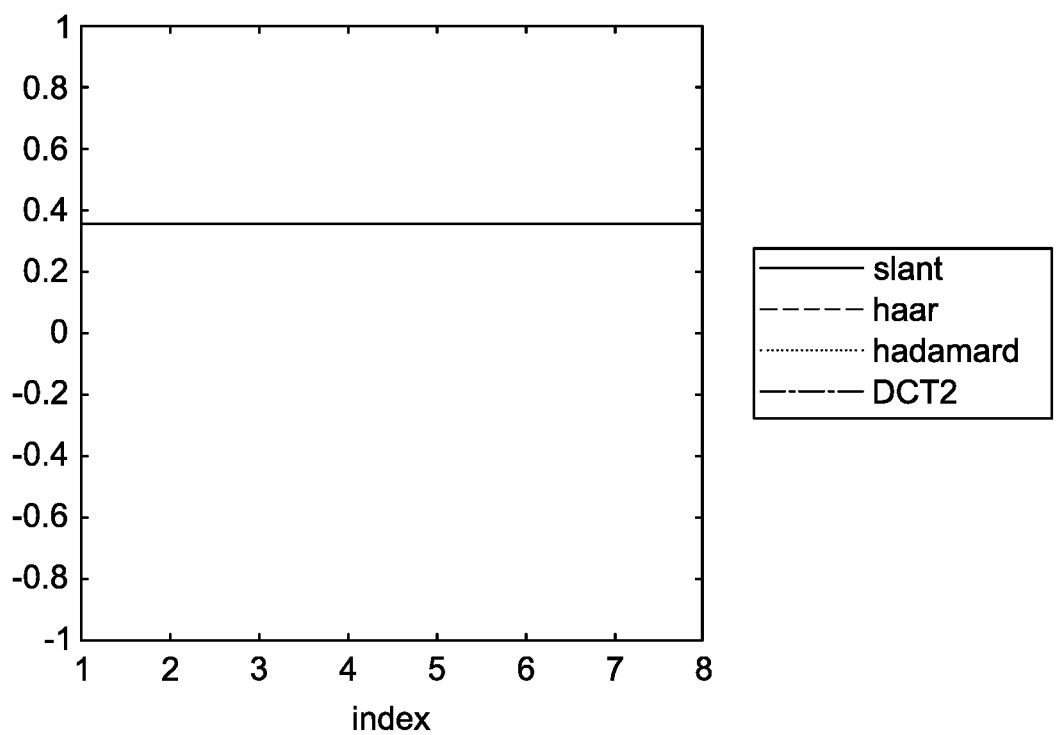
FIG. 5 through 12 illustrate basis functions of various examples of transforms.
Figure 6:
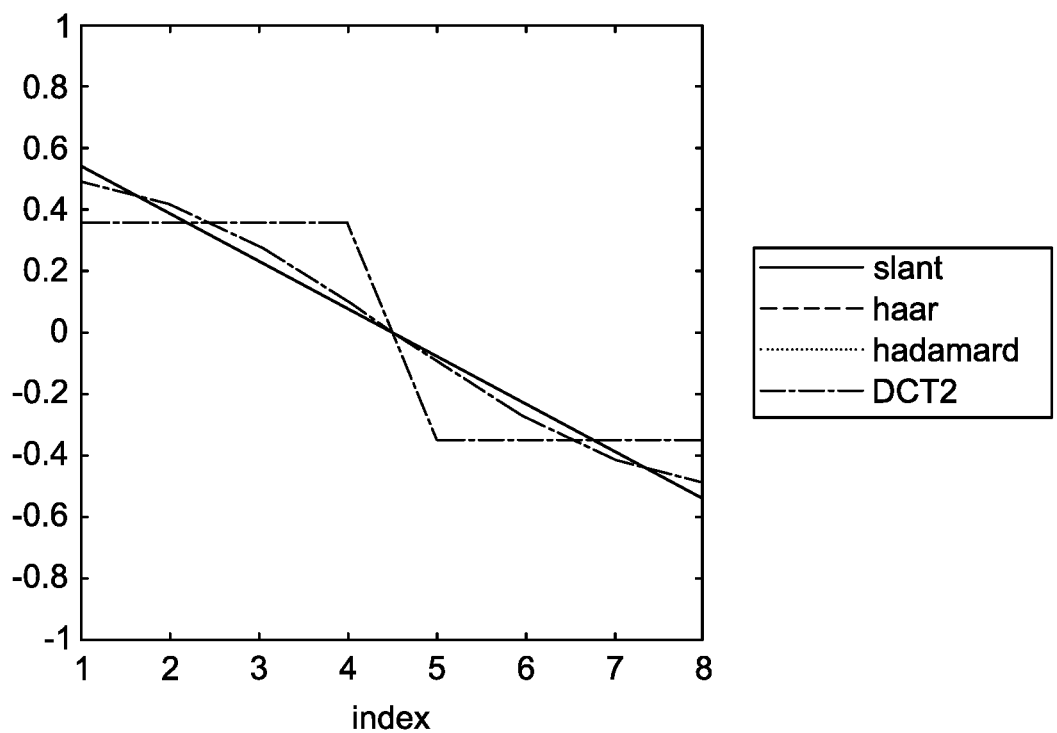
Figure 7:
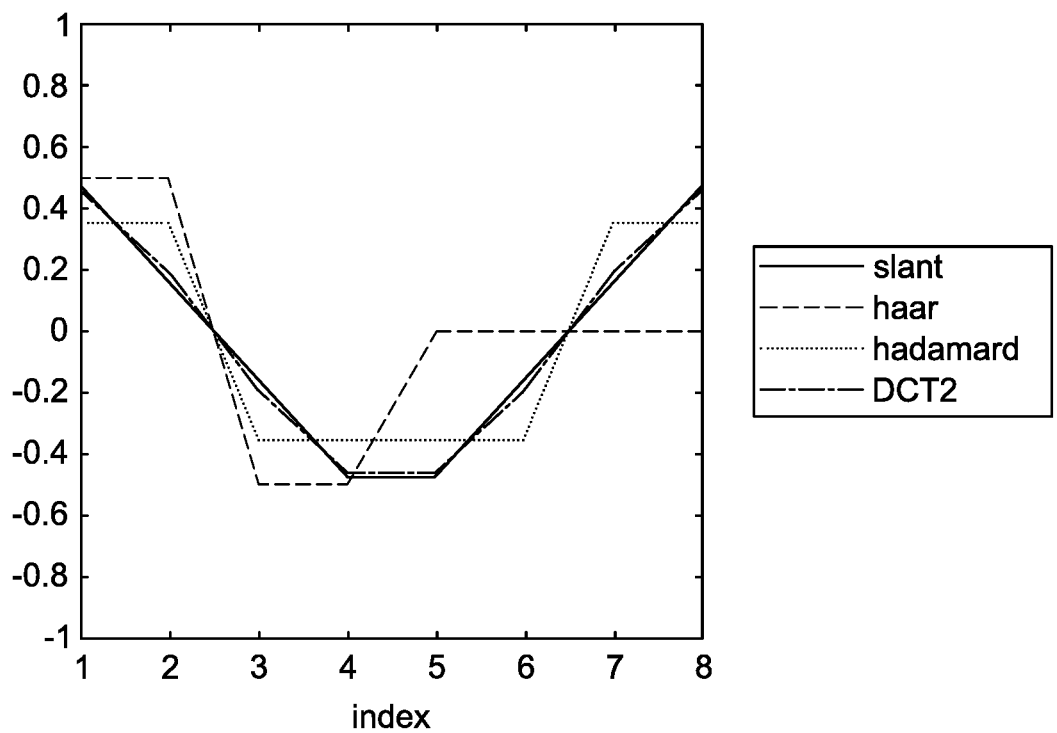
Figure 8:
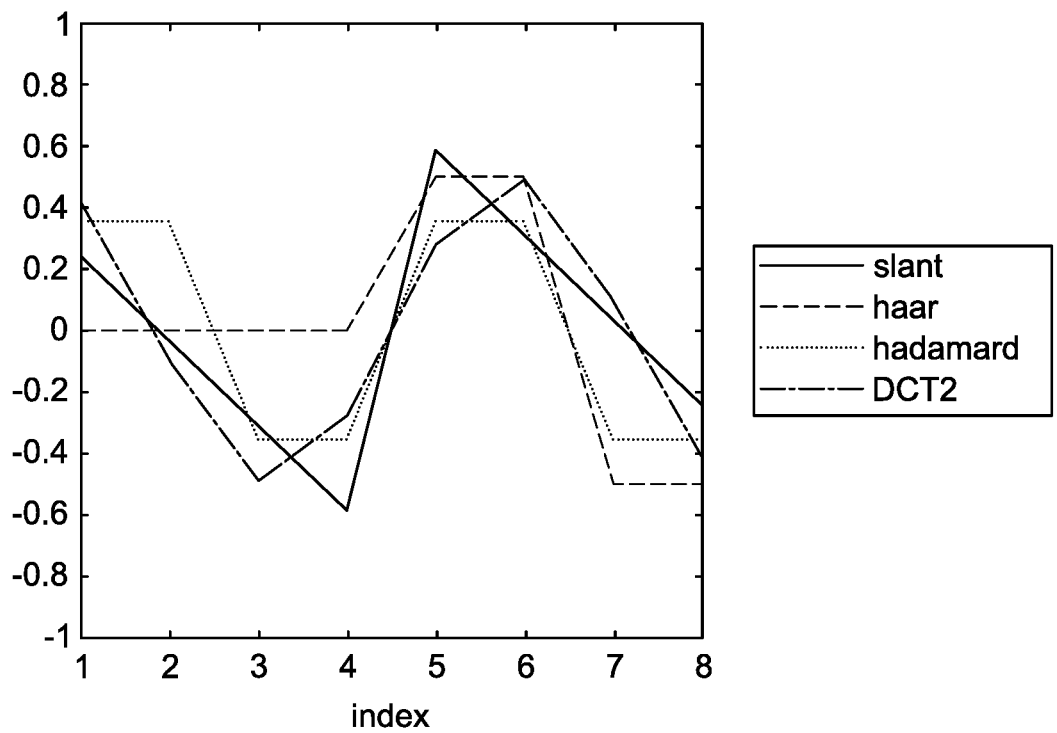
Figure 9:
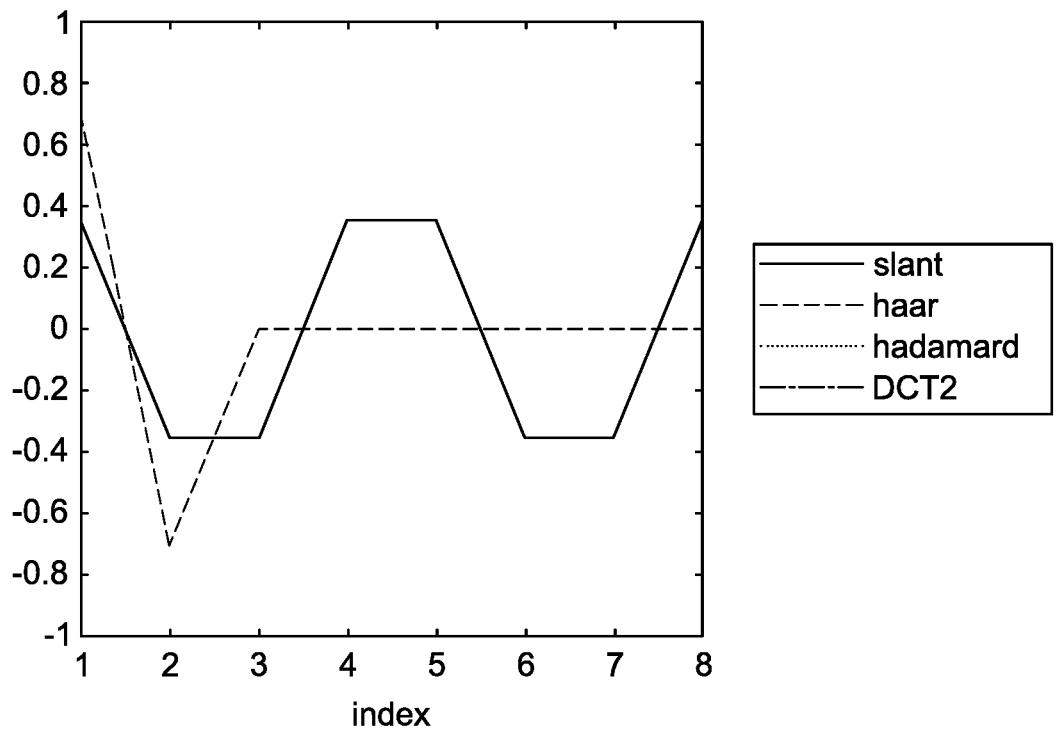
Figure 10:
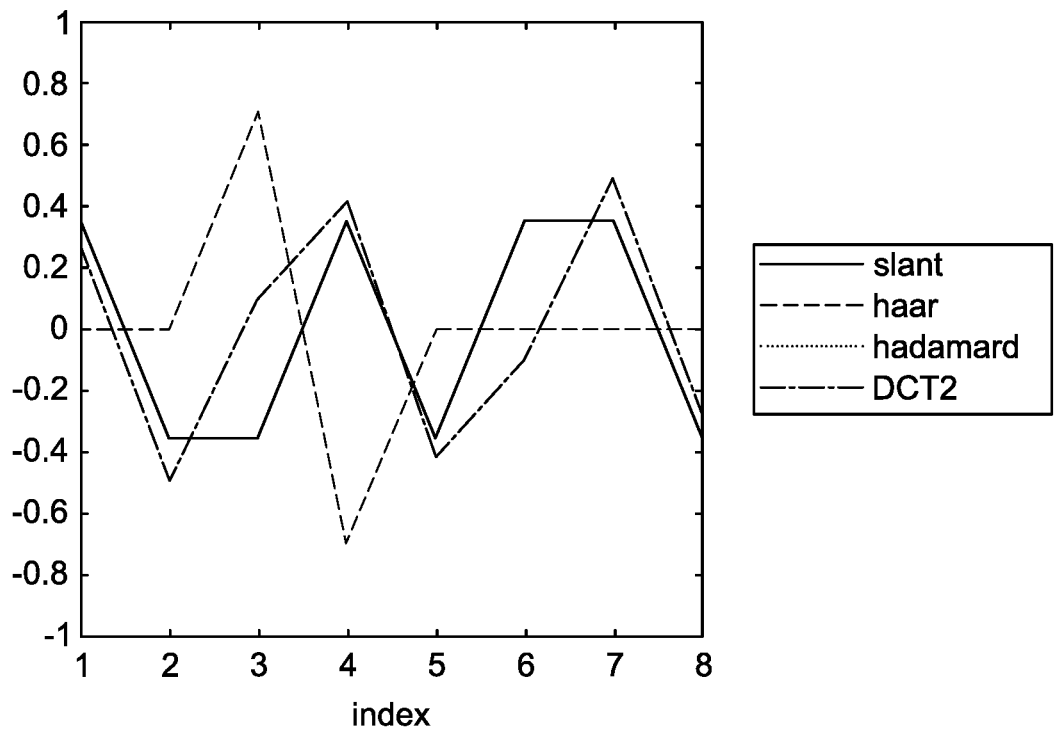
Figure 11:
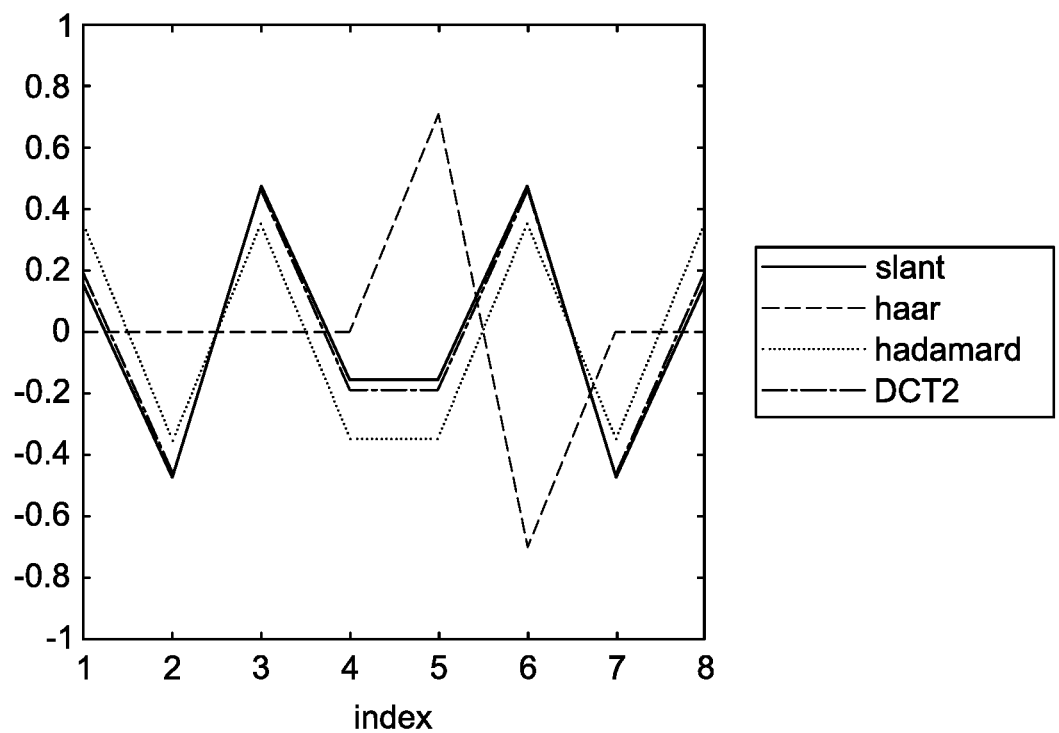
Figure 12:
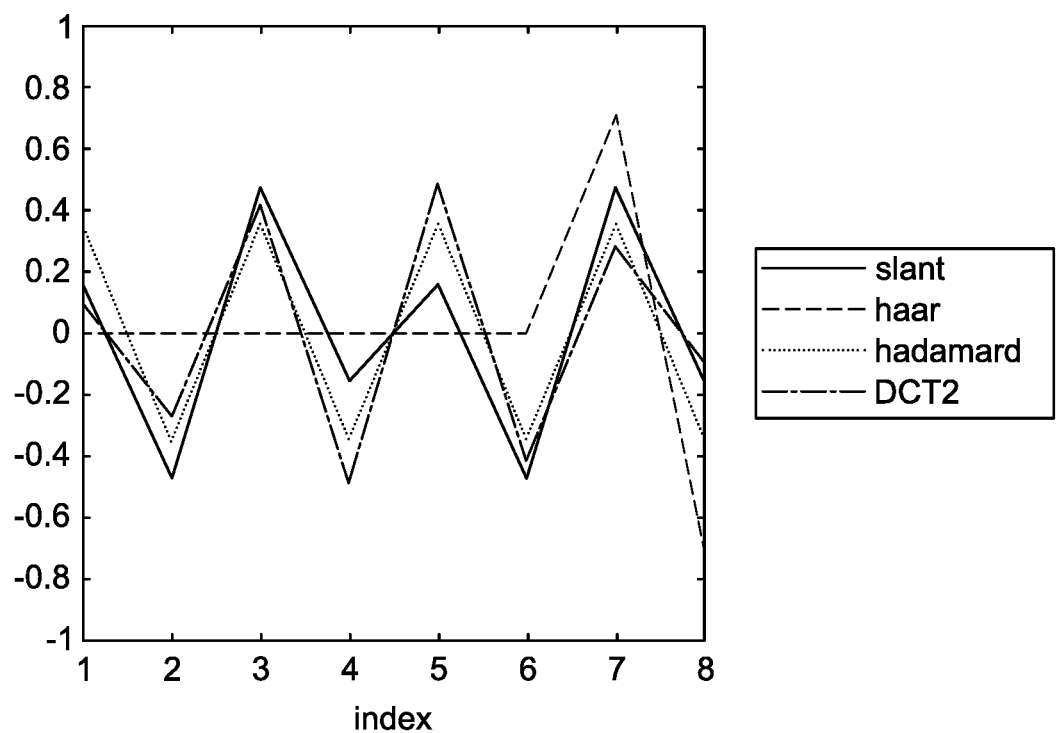

FIGS. 5 through 12 show the basis functions of each of the examples of alternative transforms referenced above for the example of a transform block size of 8×8. In particular, FIG. 5 depicts the first basis functions of Slant, Haar, Hadamard and DCT2 transforms, and correspondingly FIGS. 6 to 12 depict the second to eights basis functions. I.e., each Figure shows the basis function of the corresponding row of the transform matrix, wherein the index 1 to 8 gives the matrix value for the particular basis function at the corresponding column in the transform matrix.

The following observations can be made regarding the examples shown in FIGS. 5 through 12:

1—All the transforms share the same lowest frequency basis function (constant value).
2—Haar and Walsh-Hadamard basis functions correspond to step-wise changes, whereas Slant and DCT2 basis functions represent smoother transitions.
3—Beyond the second basis function, the Haar basis functions contain one or two zeros periods. This is suitable for residual signals that have some sharp edges.
4—Both Walsh-Hadamard and Slant basis functions have one-to-one mapping with the DCT2 basis functions in terms of frequency analysis. This is because the number of zeros crossings, for each basis function, is the same for the three transforms.
5—Slant transform basis functions are very similar to those of DCT2. However, Slant basis functions have a linear transition (constant slope) between positive and negative values, whereas DCT2 basis functions have smooth transitions.

Accordingly, even though there is an overlap for a few basis functions of alternative transforms, generally each of these examples of other or alternative transforms has its own properties. In particular, Haar and Walsh-Hadamard can be suitable for sharp transitions, Haar can be suitable for edges and Slant can be suitable for linear transitions.

Figure 14:
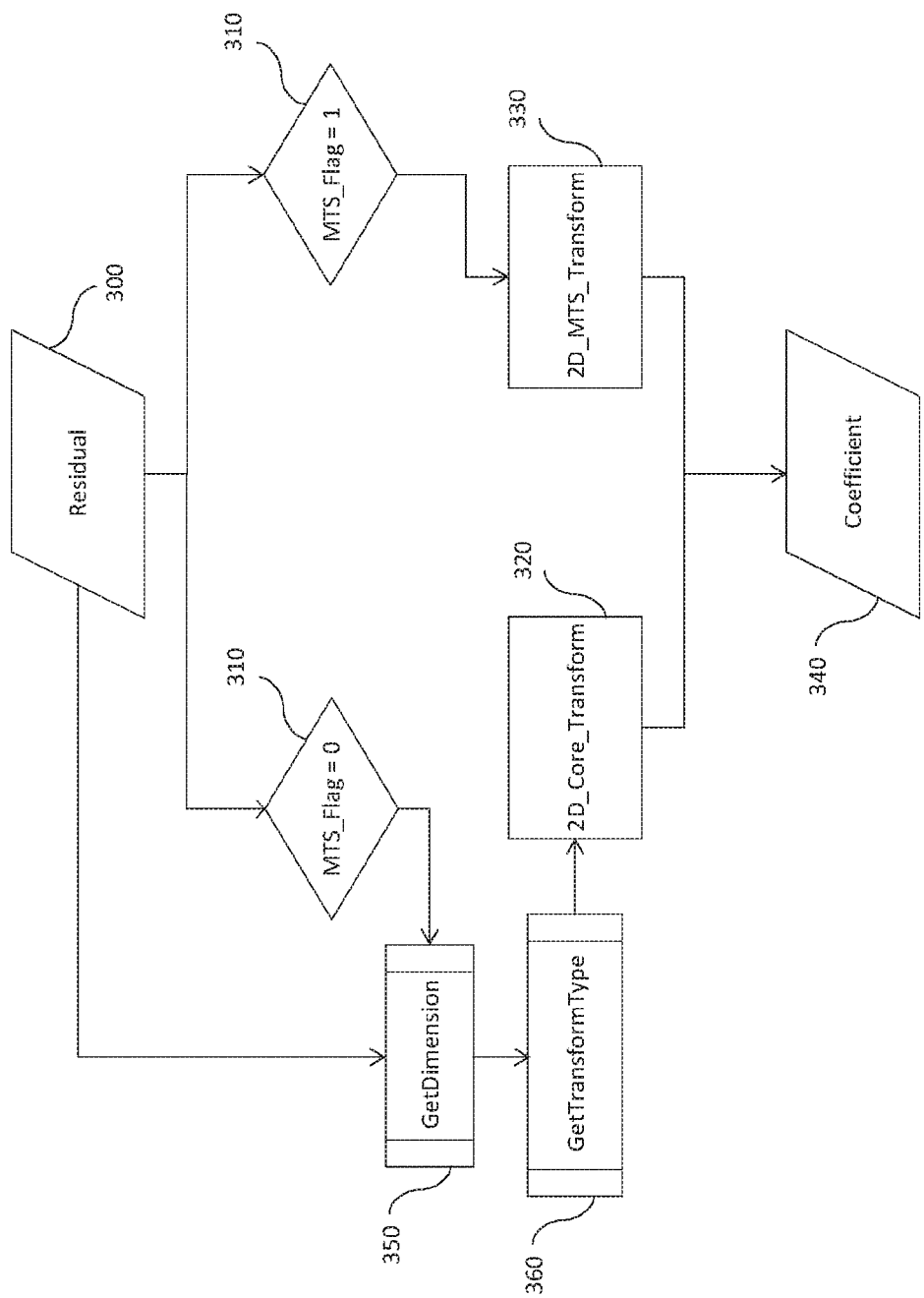
FIG. 14 through 16 illustrate various examples of embodiments in accordance with one or more aspects of the present disclosure.

According to a general aspect of at least one example of an embodiment, the core transform can be replaced. An example is illustrated in FIG. 14. Features corresponding with the steps of FIG. 13 are designated with the same reference signs. In this example, if in step 310 the value of the MTS-Flag is determined to be equal to "1", one of the default MTS transforms is applied in step 330, corresponding to the default transform design shown in FIG. 13. However, if the value of the MTS-Flag is determined to be equal to "0", the default core transform of DCT2 is replaced, for example, by another transform such as any one of the Haar, Walsh-Hadamard and Slant transforms for application on the residual signal in step 320. This is because these transforms can better fit the residual signal statistics. The replacement is either in one or two dimensions of the transform.

The replacement can be done directly for all cases, or, as also illustrated in the example embodiment of FIG. 14, depending on the transform size or block shape which is determined in the GetDimension step 350. For example, small transform sizes correspond to highly correlated residuals with possibly simple transition that can be captured by the slant transform. Otherwise, larger transform sizes possibly correspond to a sharp edge that is better captured by Haar/Walsh-Hadamard transform. Based on the determined dimension the transform replacing the default core transform is selected in GetTransformType step 360 and applied in step 320.

Also, the transform block shape can be used to deduce the transform type. For a non-square block, it can be assumed that the shorter dimension corresponds to a less correlated residual than the other dimension. Therefore, the shorter dimension uses the Haar/Walsh-Hadamard transform as an edge may exists, whereas the other dimension uses the Slant or DCT2 transform. This case can be further signaled to the decoder by an extra flag, to distinguish between the regular transform coding and shape adaptive coding. Such a flag can be included in syntax used for encoding and decoding and could be included in a bitstream created by an encoder and decoded by a decoder such as the example encoder and decoder shown in FIGS. 1 and 2, respectively.

In general, at least one embodiment can include using the prediction mode such as one of the intra prediction modes shown in FIGS. 3A and 3B to infer the transform type. An example of another embodiment illustrating using prediction mode to infer the transform type is shown in FIG. 15, however, the prediction mode could also be used in the above described example embodiment of FIG. 14.

Figure 15:
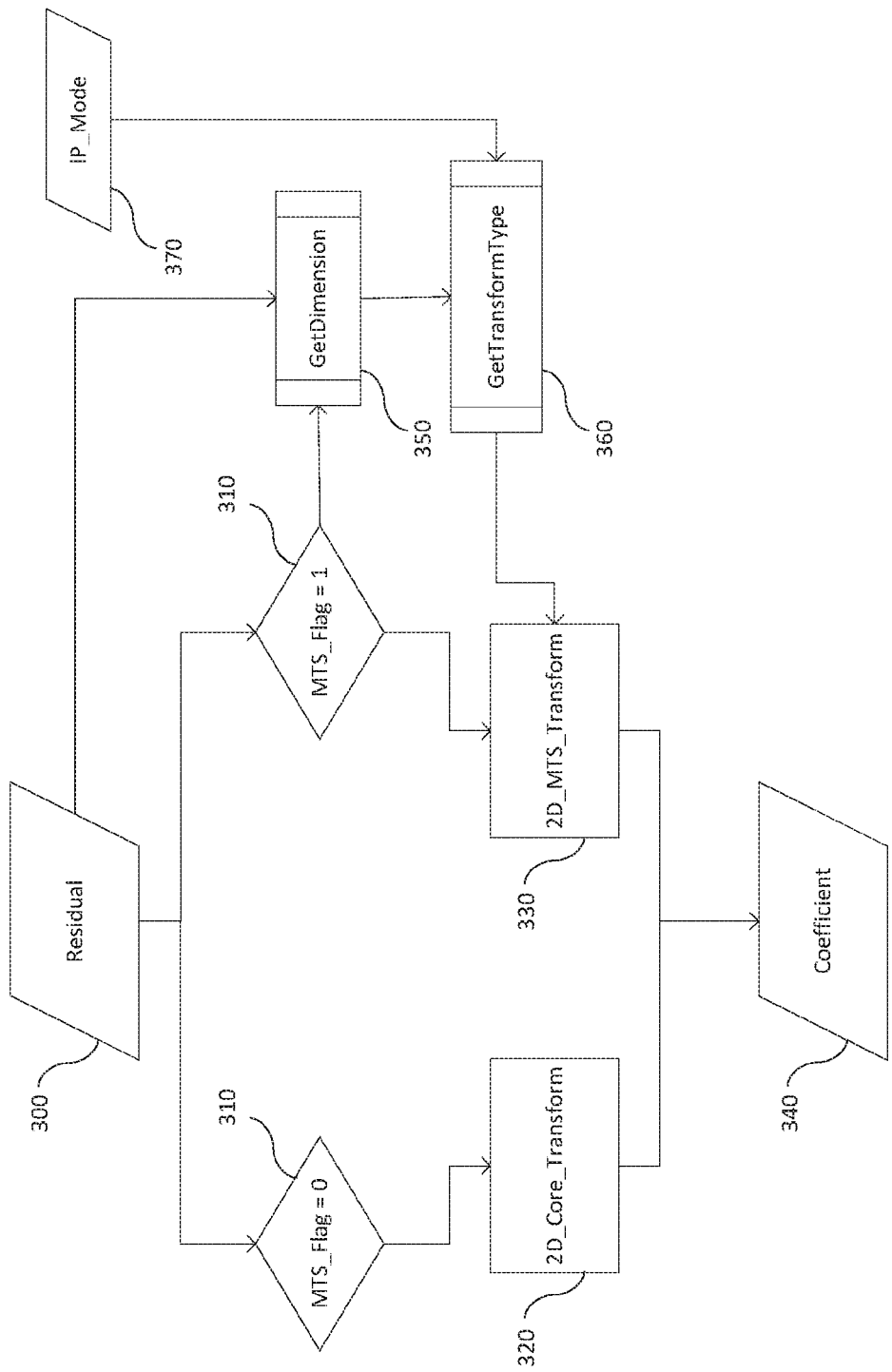

Other than replacing the core transform in the embodiment of FIG. 14, in the embodiment of FIG. 15 the core transform is unchanged, i.e. still corresponds to the default core transform. Instead, if the value of the MTS-Flag is determined to be equal to "1", at least one of the default MTS transforms is replaced by a new transform. In this embodiment, along with the dimension of the transform size or block shape, respectively, determined in GetDimension step 350, the prediction mode obtained in IP Mode step 370 controls the GetTransformType step 360. Then, the MTS transforms are replaced in step 330 by other transforms, e.g., Slant, Haar, or Walsh-Hadamard transforms as described above, where the replacement depends on the size/shape of the residual signal and/or the intra prediction mode (IP mode). Instead of Haar/Walsh-Hadamard transform, another transform could be used. For example, the identity transform could advantageously be used because it corresponds to the maximum discontinuity. Therefore, the above scenarios can be implemented with this transform.

Furthermore, for inter-predicted residuals the use of Haar transforms can be preferable in case that the residual signal corresponds to multiple prediction units. This is because the multiple prediction units are usually associated with edges around the prediction boundaries that are better captured by the Haar transform.

Also, same as for the embodiment of FIG. 14, also for the embodiment of FIG. 15 the replacement is either in one or two dimensions of the transform.

In at least one other example of an embodiment, the MTS transforms currently envisioned, e.g., DCT8/DST7, correspond to smoothly varying signals and could be replaced by any of the examples of alternative transforms, e.g., Slant, Haar, Walsh-Hadamard and Identity. This can be done by a direct replacement, or depending on the transform size. In a more general scenario, the combination of the horizontal and vertical transforms can depend on the intra prediction mode.

Figure 16:
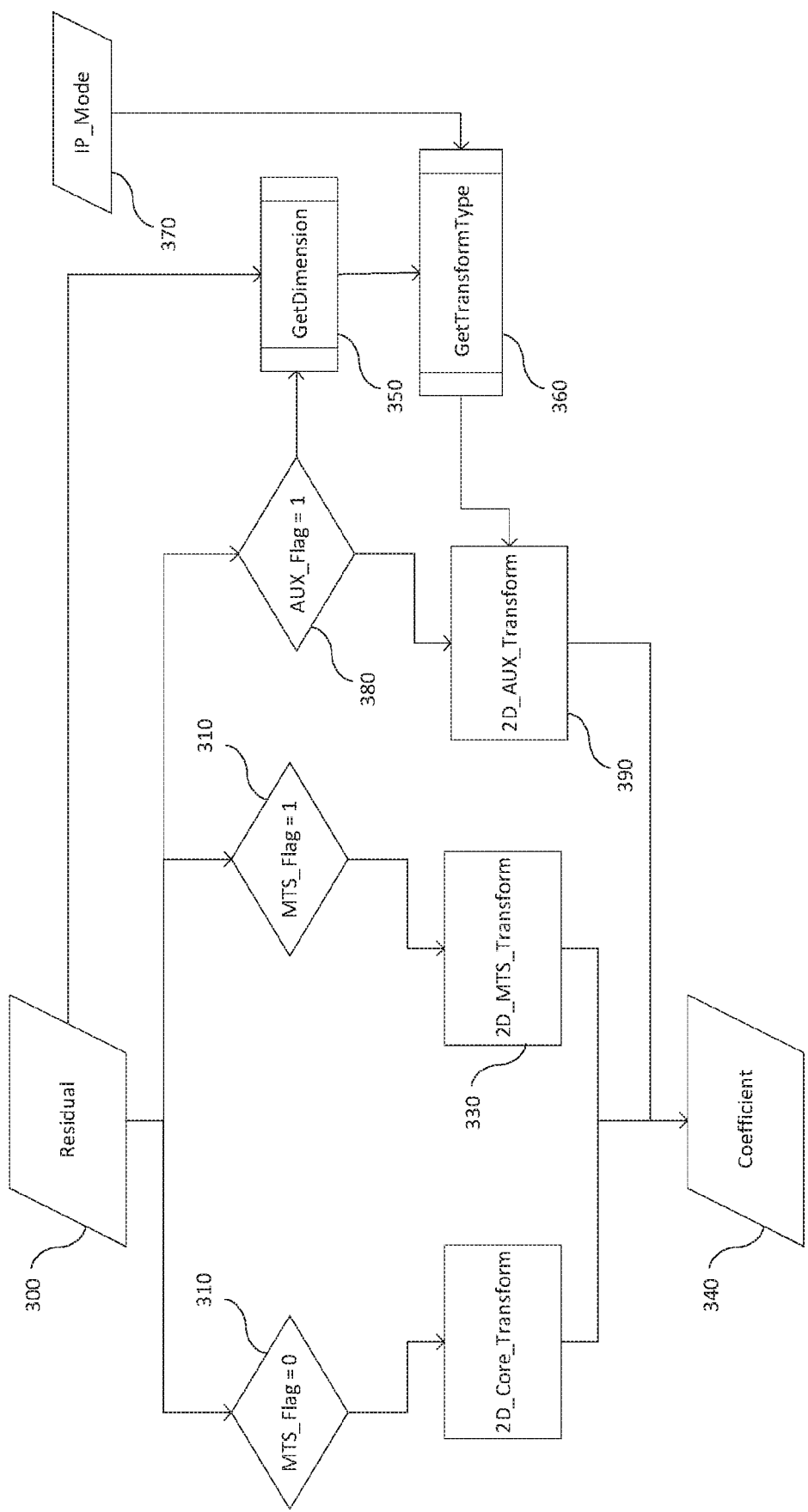

At least one other example of an embodiment is illustrated in FIG. 16. In FIG. 16, instead of replacing the core transform or the MTS transforms, an auxiliary MTS can be used that contains uniquely one or more of other transforms such as the examples of auxiliary transforms described herein. An aspect involves providing the encoder with an extra transform that can capture the characteristics of the residual signal. The use of the Auxiliary MTS is signaled by a syntax element AUX-Flag which specifies whether the default MTS transform or a transform according to the Auxiliary MTS is selected for the transformation. This could be signaled at the CU level/the slice or tile level, or the PPS level to reduce the overall signaling. If the value of the MTS-Flag is determined in step 380 to be equal to "1", instead of the MTS transforms the Auxiliary transforms are applied in step 390, if appropriate, considering again the dimension of the transform size or block shape and/or the prediction mode.

For example, the default available transforms set is {DCT2, DCT8, DST7}. Then, for example, when a particular condition is met, e.g., a certain type of content such as screen content, the auxiliary set for screen content is used, wherein the set becomes {DCT2, Haar, Identity}. Alternatively, the set can be completely described by simply giving the index of the transforms used in the set as an index in a pre-defined table, e.g., {0, 3, 4} for a table given by:

| index | transform |
|-------|-----------|
| 0 | DCT2 |
| 1 | DCT8 |
| 2 | DST7 |
| 3 | Haar |
| 4 | Identity |
| 5 | Slant |
| 6 | Walsh-Hadamard |

The above FIGS. 14 to 16 show example embodiments for encoding a signal, where a prediction residual determined for a block of spatial-domain values is transformed as mentioned above to a block of transform coefficients. However, the Figures apply in the same way for decoding a signal when contemplated in the inverse order, i.e. from bottom to top and inverting the order of steps and the signal flow.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Examples of embodiments in accordance with the present disclosure include but are not limited to the following.

In general, at least one example of an embodiment can involve a method for encoding, comprising: obtaining a signal; determining a block of spatial-domain values for a prediction residual; replacing in a set of multiple transforms at least one first transform matrix with at least one second transform matrix and/or adding at least one second transform matrix to said set of multiple transforms; and transforming the block of spatial-domain values using said second transform matrix.

In general, at least one example of an embodiment can involve a method for decoding, comprising: receiving an encoded signal; obtaining from the received encoded signal a block of transform coefficients; replacing in a set of multiple transforms at least one first transform matrix with at least one second transform matrix and/or adding at least one second transform matrix to said set of multiple transforms; and inverse transforming the block of transform coefficients using said second transform matrix.

In general, at least one example of an embodiment can involve an encoding apparatus comprising one or more processors configured to obtain a signal; determine a block of spatial-domain values for a prediction residual; replace in a set of multiple transforms at least one first transform matrix with at least one second transform matrix and/or add at least one second transform matrix to said set of multiple transforms; and transform the block of spatial-domain values using said second transform matrix.

In general, at least one example of an embodiment can involve a decoding apparatus comprising one or more processors configured to receive an encoded signal; obtain from the received encoded signal a block of transform coefficients; replace in a set of multiple transforms at least one first transform with at least one second transform matrix and/or add at least one second transform matrix to said set of multiple transforms; and inverse transform the block of transform coefficients using said second transform matrix.

In general, at least one example of an embodiment can involve a method, comprising: obtaining a signal including image information; determining a block of spatial-domain values for a prediction residual; replacing in a set of multiple transforms at least one first transform matrix with at least one second transform matrix and/or adding at least one second transform matrix to said set of multiple transforms; transforming the block of spatial-domain values using said second transform matrix; and encoding at least a portion of the image information based on the transforming of the block of spatial-domain values.

In general, at least one example of an embodiment can involve a method, comprising: receiving an encoded signal including encoded image information; obtaining from the received encoded signal a block of transform coefficients; replacing in a set of multiple transforms at least one first transform matrix with at least one second transform matrix and/or adding at least one second transform matrix to said set of multiple transforms; inverse transforming the block of transform coefficients using said second transform matrix; and decoding at least a portion of the encoded image information based on the inverse transforming of the block of transform coefficients.

In general, at least one example of an embodiment can involve an apparatus, comprising: one or more processors configured to obtain a signal including image information; determine a block of spatial-domain values for a prediction residual; replace in a set of multiple transforms at least one first transform matrix with at least one second transform matrix and/or add at least one second transform matrix to said set of multiple transforms; transform the block of spatial-domain values using said second transform matrix; and encode at least a portion of the image information based on the transform of the block of spatial-domain values.

In general, at least one example of an embodiment can involve an apparatus, comprising: one or more processors configured to receive an encoded signal including encoded image information; obtain from the received encoded signal a block of transform coefficients; replace in a set of multiple transforms at least one first transform matrix with at least one second transform matrix and/or add at least one second transform matrix to said set of multiple transforms; inverse transform the block of transform coefficients using said second transform matrix; and decode at least a portion of the encoded image information based on the inverse transform of the block of transform coefficients.

In general, at least one example of an embodiment can involve a method or apparatus as described herein, wherein image information included in a signal at least partially contains non-camera-captured image content; at least one first transform matrix is adapted to transform camera captured image content; and at least one second transform matrix is adapted to transform non-camera-captured image content.

In general, at least one example of an embodiment can involve a method or apparatus as described herein, wherein non-camera-captured image content contains at least one of computer-generated graphics, text, or animation.

In general, at least one example of an embodiment can involve a method or apparatus as described herein, and further comprising adding a set of multiple auxiliary transforms to be used for non-camera-captured image content, wherein adding at least one second transform matrix is part of said adding a set of multiple auxiliary transforms; and switching from the set of multiple transforms to be used for camera captured image content to said added set of multiple auxiliary transforms to be used for non-camera-captured image content for using said second transform matrix.

In general, at least one example of an embodiment can involve a method or apparatus as described herein, wherein multiple transforms to be used for camera captured image content and multiple auxiliary transforms to be used for non-camera-captured image content are defined based on index values corresponding to entries in a table of transforms.

In general, at least one example of an embodiment can involve a method or apparatus as described herein, and further comprising applying one or more auxiliary transforms of a set of multiple auxiliary transforms instead of at least one first transform matrix; and providing one or more index values corresponding to the applied one or more auxiliary transforms for use by a decoder.

In general, at least one example of an embodiment can involve a method or apparatus as described herein, and further comprising obtaining at least one of one or more index values from the received encoded signal; applying one or more auxiliary transforms corresponding to the one or more index values instead of the at least one first transform matrix.

In general, at least one example of an embodiment can involve a method or apparatus as described herein, wherein the elements of at least one first transform matrix correspond to an approximation of a discrete cosine transform or an approximation of a discrete sine transform.

In general, at least one example of an embodiment can involve a method or apparatus as described herein, wherein at least one second transform matrix corresponds to a Haar transform, a Walsh-Hadamard transform, a Slant transform or an identity transform.

In general, at least one example of an embodiment can involve a method or apparatus as described herein, and further comprising determining at least one second transform matrix for replacing the first transform matrix based on at least one of a shape and/or size of the block and/or a prediction mode.

In general, at least one example of an embodiment can involve a method or apparatus as described herein, wherein for different block sizes different transforms having differing suitability for differently correlated residuals are applied and wherein for a small transform size a transform is applied which is more suitable for a highly correlated residual than a transform applied for a larger transform size.

In general, at least one example of an embodiment can involve a method or apparatus as described herein, wherein for a small transform size a Slant transform is applied and for a larger transform size a Haar transform or a Walsh-Hadamard transform is applied.

In general, at least one example of an embodiment can involve a method or apparatus as described herein, wherein for a non-square block different transforms are applied for the horizontal and vertical dimension and in the shorter dimension a transform is applied which is more suitable for a less correlated residual than the transform applied for the other dimension.

In general, at least one example of an embodiment can involve a method or apparatus as described herein, wherein for the shorter dimension a Haar transform or a Walsh-Hadamard transform is applied and for the other dimension a Slant or DCT2 transform is applied.

In general, at least one example of an embodiment can involve a method or apparatus as described herein, wherein the signal contains at least one of a single image, image collections, or a video signal corresponding to a sequence of images.

In general, at least one example of an embodiment can involve a method or apparatus as described herein, wherein a second transform function has a basis function including a discontinuity and/or constant increase or decrease.

In general, at least one example of an embodiment can involve a signal comprising data generated according to a method or apparatus as described herein.

In general, at least one example of an embodiment can involve a computer readable storage medium having stored thereon instructions for encoding or decoding data according to any example of a method described herein.

In general, at least one example of an embodiment can involve a non-transitory computer readable medium storing executable program instructions to cause a computer executing the instructions to perform a method according to any example described herein.

In general, at least one example of an embodiment can involve a bitstream, formatted to include encoded image information, wherein the encoded image information includes: an indicator associated with modifying a set of multiple transforms according to any example of a method described herein; and picture data encoded based on the modified set of multiple transforms.

In general, at least one example of an embodiment can involve an apparatus according to any example of an embodiment of apparatus described herein, and further comprising at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve any example of an embodiment of a device as described herein, wherein the device comprises one of a television, a television signal receiver, a set-top box, a gateway device, a mobile device, a cell phone, a tablet, or other electronic device that performs video encoding and/or decoding according to any of the embodiments described.

Figure 17:
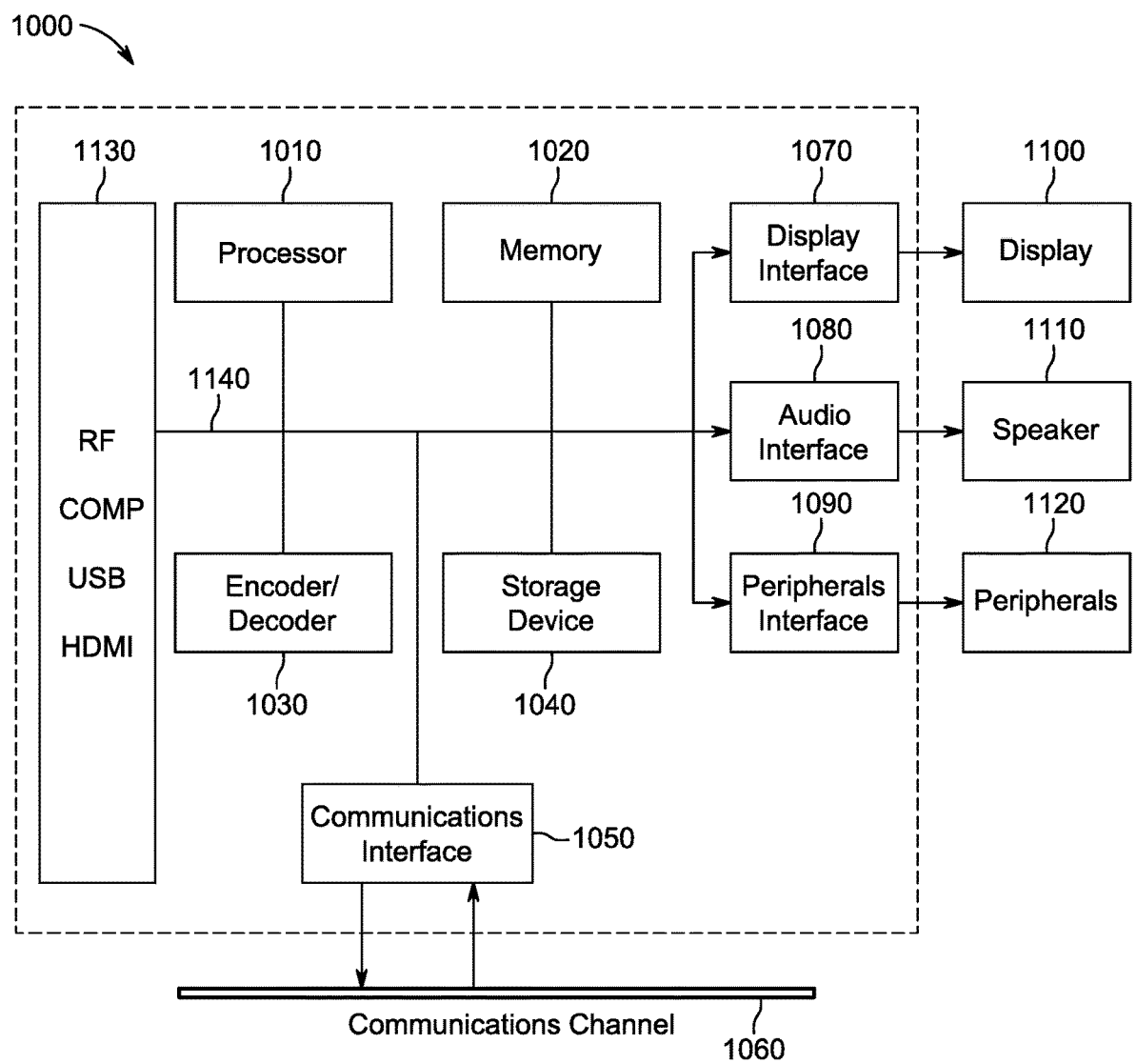
FIG. 17 illustrates a block diagram of an exemplary system in which various aspects of the exemplary embodiments may be implemented.

The various examples of embodiments described and contemplated in this document can be implemented in many different forms. FIGS. 1, 2 and 17 provide some examples of embodiments as described herein, but other embodiments are contemplated and the discussion of FIGS. 1, 2 and 17 does not limit the breadth of the implementations. At least one of the aspects generally relates to video encoding and decoding, and at least one other aspect generally relates to transmitting a bitstream generated or encoded. These and other embodiments, features, aspects, etc., can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of intra prediction modes (35, or 67), or the number of transform subsets (3). It should be noted that the specific values are for exemplary purposes and the present embodiments are not limited to these specific values.

In the above, various embodiments are described with respect to HEVC, or JEM. For example, various examples of aspects and embodiments in accordance with the present disclosure may be used to modify the transform module (125) and/or one or both of the inverse transform modules (150) and (250) of the JEM or HEVC encoder and decoder examples shown in FIG. 1 and FIG. 2. However, the present embodiments are not limited to JEM or HEVC, and can be applied to other standards, recommendations, and extensions thereof.

FIG. 17 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

FIG. 18 illustrates an exemplary encoding method 1200 according to a general aspect of at least one embodiment. A signal to be encoded, such as a video signal which at least partially contains non-camera-captured image content, is obtained in step 1210. At step 1220 a block of spatial-domain values for a prediction residual is determined. As described above, at step 1230, in a set of multiple transforms at least one first transform matrix is replaced with at least one second transform matrix and/or at least one second transform matrix is added to the set of multiple transforms. At step 1240, the block of spatial-domain values is transformed using said second transform matrix. The above method can repeat until all blocks in an image of a video signal have been encoded.

The decoding method will to some extent perform the operations in the opposite order and do "inverse" operations as shown in FIG. 19, which illustrates an exemplary decoding method 1300 according to a general aspect of at least one embodiment. In step 1310 an encoded signal is received, for example via the input block 1130 of system 1000 illustrated in FIG. 17. From the received encoded signal a block of transform coefficients is obtained in step 1320. In step 1330 in a set of multiple transforms at least one first transform matrix is replaced with at least one second transform matrix and/or at least one second transform matrix is added to the set of multiple transforms. Finally, by inverse transforming the block of transform coefficients using said second transform matrix in step 1340 a block of the signal is reconstructed.

The above presents a simplified decoding and coding method in order to provide a basic understanding of some aspects of subject matter embodiments. As such, the encoding and decoding step are not limited to the above described sub-steps. Additional features, variants and advantages of the present disclosure will be made apparent from the following detailed description of illustrative embodiments.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

Providing a method for encoding, comprising determining a block of spatial-domain values for a prediction residual; replacing in a set of multiple transforms at least one first transform matrix with at least one second transform matrix and/or adding at least one second transform matrix to said set of multiple transforms; and transforming the block of spatial-domain values using said second transform matrix.

Providing a method for encoding, comprising obtaining a signal; determining a block of spatial-domain values for a prediction residual; replacing in a set of multiple transforms at least one first transform matrix with at least one second transform matrix and/or adding at least one second transform matrix to said set of multiple transforms; and transforming the block of spatial-domain values using said second transform matrix.

Providing a method for encoding, comprising obtaining a signal including image content; determining a block of spatial-domain values for a prediction residual; replacing in a set of multiple transforms at least one first transform matrix with at least one second transform matrix and/or adding at least one second transform matrix to said set of multiple transforms; transforming the block of spatial-domain values using said second transform matrix; and encoding the image content based on the transformed block of spatial-domain values.

Providing a method for decoding, comprising obtaining a block of transform coefficients; replacing in a set of multiple transforms at least one first transform matrix with at least one second transform matrix and/or adding at least one second transform matrix to said set of multiple transforms; and inverse transforming the block of transform coefficients using said second transform matrix.

Providing a method for decoding, comprising receiving an encoded signal; obtaining from the received encoded signal a block of transform coefficients; replacing in a set of multiple transforms at least one first transform matrix with at least one second transform matrix and/or adding at least one second transform matrix to said set of multiple transforms; and inverse transforming the block of transform coefficients using said second transform matrix.

Providing a method for decoding, comprising receiving an encoded signal including image content; obtaining from the received encoded signal a block of transform coefficients; replacing in a set of multiple transforms at least one first transform matrix with at least one second transform matrix and/or adding at least one second transform matrix to said set of multiple transforms; inverse transforming the block of transform coefficients using said second transform matrix; and decoding the image content based on the inverse transformed block of transform coefficients.

Providing an encoding apparatus comprising one or more processors configured to determine a block of spatial-domain values for a prediction residual; replace in a set of multiple transforms at least one first transform matrix with at least one second transform matrix and/or add at least one second transform matrix to said set of multiple transforms; and transform the block of spatial-domain values using said second transform matrix.

Providing an encoding apparatus comprising one or more processors configured to obtain a signal; determine a block of spatial-domain values for a prediction residual; replace in a set of multiple transforms at least one first transform matrix with at least one second transform matrix and/or add at least one second transform matrix to said set of multiple transforms; and transform the block of spatial-domain values using said second transform matrix.

Providing an encoding apparatus comprising one or more processors configured to obtain a signal including image content; determine a block of spatial-domain values for a prediction residual; replace in a set of multiple transforms at least one first transform matrix with at least one second transform matrix and/or add at least one second transform matrix to said set of multiple transforms; transform the block of spatial-domain values using said second transform matrix; and encode the image content based on the transformed block of spatial-domain values.

Providing a decoding apparatus comprising one or more processors configured to obtain a block of transform coefficients; replace in a set of multiple transforms at least one first transform with at least one second transform matrix and/or add at least one second transform matrix to said set of multiple transforms; and inverse transform the block of transform coefficients using said second transform matrix.

Providing a decoding apparatus comprising one or more processors configured to receive an encoded signal; obtain from the received encoded signal a block of transform coefficients; replace in a set of multiple transforms at least one first transform with at least one second transform matrix and/or add at least one second transform matrix to said set of multiple transforms; and inverse transform the block of transform coefficients using said second transform matrix.

Providing a decoding apparatus comprising one or more processors configured to receive an encoded signal including image content; obtain from the received encoded signal a block of transform coefficients; replace in a set of multiple transforms at least one first transform with at least one second transform matrix and/or add at least one second transform matrix to said set of multiple transforms; inverse transform the block of transform coefficients using said second transform matrix; and decode the image content based on the inverse transformed block of transform coefficients.

Providing a method or apparatus for encoding or decoding as described above, wherein the signal at least partially contains non-camera-captured image content; the at least one first transform matrix is adapted to transform camera captured image content; and the at least one second transform matrix is adapted to transform non-camera-captured image content.

Providing a method or apparatus for encoding or decoding and involving non-camera-captured image content as described above, wherein the non-camera-captured image content contains at least one of computer-generated graphics, text, or animation.

Providing a method or apparatus for encoding or decoding and involving non-camera-captured image content as described above, further comprising adding a set of multiple auxiliary transforms to be used for non-camera-captured image content, wherein adding at least one second transform matrix is part of adding a set of multiple auxiliary transforms; and switching from the set of multiple transforms to be used for camera captured image content to the added set of multiple auxiliary transforms to be used for non-camera-captured image content for using said second transform matrix.

Providing a method or apparatus for encoding or decoding as described above, wherein multiple transforms to be used for camera captured image content and multiple auxiliary transforms to be used for non-camera-captured image content are defined based on index values corresponding to entries in a table of transforms.

Providing a method or apparatus for encoding or decoding as described above, further comprising applying one or more auxiliary transforms of a set of multiple auxiliary transforms instead of the at least one first transform matrix; and providing to one or more index values corresponding to the applied one or more auxiliary transforms for use by a decoder.

Providing a method or apparatus for encoding or decoding as described above, further comprising obtaining at least one of said one or more index values from the received encoded signal; and applying one or more auxiliary transforms corresponding to said one or more index values instead of said at least one first transform matrix.

Providing a method or apparatus for encoding or decoding as described above, wherein the elements of the at least one first transform matrix correspond to an approximation of a discrete cosine transform or an approximation of a discrete sine transform.

Providing a method or apparatus for encoding or decoding as described above, wherein the at least one second transform matrix correspond to a Haar transform, a Walsh-Hadamard transform, a Slant transform or an identity transform.

Providing a method or apparatus for encoding or decoding as described above, further comprising determining the at least one second transform matrix for replacing the first transform matrix based on at least one of a shape and/or size of the block and/or a prediction mode.

Providing a method or apparatus for encoding or decoding as described above, wherein for different block sizes different transforms having differing suitability for differently correlated residuals are applied, and wherein for a small transform size a transform is applied which is more suitable for a highly correlated residual than a transform applied for a larger transform size.

Providing a method or apparatus for encoding or decoding as described above, wherein for a small transform size a Slant transform is applied and for a bigger transform size a Haar transform or a Walsh-Hadamard transform is applied.

Providing a method or apparatus for encoding or decoding as described above, wherein for a non-square block different transforms are applied for the horizontal and vertical dimension and in the shorter dimension a transform is applied which is more suitable for a less correlated residual than the transform applied for the other dimension.

Providing a method or apparatus for encoding or decoding as described above, wherein for the shorter dimension a Haar transform or a Walsh-Hadamard transform is applied and for the other dimension a Slant or DCT2 transform is applied.

Providing a method or apparatus for encoding or decoding as described above, wherein the signal contains at least one of a single image, image collections, or a video signal corresponding to a sequence of images.

Providing, in an encoder and/or decoder for processing video, for implementing transform processing based on replacing a first transform function with a second transform function having a basis function including a discontinuity and/or constant increase or decrease.

Providing, in an encoder and/or decoder for processing video, for implementing transform processing based on replacing a first transform function with a second transform function having a basis function including a discontinuity, wherein the second transform function comprises one of Haar Transform, Walsh-Hadamard Transform, Slant Transform, and identity transform.

Providing, in an encoder and/or decoder for processing video, for implementing transform processing based on replacing a first transform function with a second transform function having a basis function including a discontinuity, wherein the replacing can be based on a shape of a transform block and/or a prediction mode.

Providing, in an encoder and/or decoder for processing video, for implementing transform processing based on replacing a first transform function with a second transform function having a basis function including a discontinuity, wherein the replacing can be based on a shape of a transform block and/or a prediction mode, and wherein the second transform function comprises one of Haar Transform, Walsh-Hadamard Transform, Slant Transform, and identity transform.

Providing, in an encoder and/or decoder for processing video, for implementing transform processing based on replacing a first MTS with a second MTS, wherein the second MTS comprises transforms capturing one or more characteristics of a residual signal.

Providing, in an encoder and/or decoder for processing video, for implementing transform processing based on replacing a first MTS with a second MTS, wherein the second MTS comprises a set of one or more auxiliary transforms capturing one or more characteristics of a residual signal, and wherein the set can be described based on one or more index values corresponding to entries in a table of auxiliary transforms.

Providing in an encoder and/or decoder for processing video in accordance with one or more of the aspects and/or embodiments described herein, wherein processing the video comprises replacing a first transform with a second transform and the replacing is based on the video content comprising screen content.

Providing in an encoder and/or decoder for processing video in accordance with one or more of the aspects and/or embodiments described herein, wherein processing the video comprises replacing a first transform with a second transform and the replacing is based on the video content comprising screen content.

Providing in an encoder and/or decoder for processing video in accordance with one or more of the aspects and/or embodiments described herein, wherein processing the video comprises replacing a first transform with a second transform and the replacing is based on one or more of a characteristic of a residual signal, a transform block size or shape, and a prediction mode.

Providing one or more syntax elements for implementing transform processing based on replacing a first transform function with a second transform function having a basis function including a discontinuity and/or constant increase or decrease.

Inserting in the signaling syntax, by an encoder, one or more syntax elements that enable a decoder to provide for replacing one or more transforms for decoding in accordance with one or more transforms used for encoding by the encoder.

A bitstream or signal generated according to the methods described above that includes one or more of the described syntax elements, or variations thereof Creating and/or transmitting and/or receiving and/or decoding a bitstream or signal that includes one or more of the described syntax elements, or variations thereof A TV, set-top box, cell phone, tablet, or other electronic device that performs video encoding and/or decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs video encoding and/or decoding according to any of the embodiments described.

A TV, set-top box, cell phone, tablet, or other electronic device that receives (e.g. using an antenna) a signal over the air that includes an encoded image, and performs video encoding and/or decoding according to any of the embodiments described.

A computer program product storing program code that, when executed by a computer implements video encoding and/or decoding in accordance with any of the embodiments described.

A non-transitory computer readable medium including executable program instructions causing a computer executing the instructions to implement video encoding and/or decoding in accordance with any of the embodiments described.

A computer readable storage medium having stored thereon a bitstream generated according to the methods described above.

Various other generalized as well as particularized embodiments are also supported and contemplated throughout this disclosure.

The invention claimed is:

1. A method, comprising:
obtaining a signal including image information including non-camera-captured image content;
determining a block of spatial-domain values for a prediction residual;
replacing, based on information included in the signal, a first transform in a first set of multiple transforms with a second transform in a second set of multiple transforms for the non-camera-captured image content;
transforming the block of spatial-domain values using the second transform; and
encoding at least a portion of the image information based on the transforming of the block of spatial-domain values,
wherein the second transform comprises one of a Haar transform, a Walsh-Hadamard transform, a Slant transform, or an identity transform.

2. The method of claim 1, wherein the transforms included in the first set of multiple transforms and the second set of multiple transforms are defined based on one or more index values corresponding to entries in a table of transforms.

3. The method of claim 1, wherein for different block sizes different transforms having differing suitability for differently correlated residuals are applied and below a predetermined transform size a transform is applied which is more suitable for a highly correlated residual.

4. The method of claim 1, further comprising determining the second transform for replacing the first transform based on at least one of a shape and/or size of the block and/or a prediction mode.

5. The method of claim 4, wherein below a predetermined transform size the Slant transform is applied and above the predetermined transform size the Haar transform or the Walsh-Hadamard transform is applied.

6. The method of claim 4, wherein for a non-square block different transforms are applied for a horizontal dimension and a vertical dimension, the shortest of the horizontal dimension or the vertical dimension having a transform applied which is more suitable for a less correlated residual.

7. The method of claim 6, wherein the Haar transform or the Walsh-Hadamard transform is applied to the shortest of the horizontal dimension or the vertical dimension.

8. A method, comprising:
obtaining a block of transform coefficients from a signal including encoded image information including non-camera-captured image content;
replacing, based on information included in the signal, a first transform in a first set of multiple transforms with a second transform in a second set of multiple transforms for the non-camera-captured image content;
inverse transforming the block of transform coefficients using said second transform; and
decoding at least a portion of the encoded image information based on an inverse transforming of the block of transform coefficients,
wherein the second transform comprises one of a Haar transform, a Walsh-Hadamard transform, a Slant transform, or an identity transform.

9. The method of claim 8, wherein the transforms included in the first set of multiple transforms and the second set of multiple transforms are defined based on one or more index values corresponding to entries in a table of transforms.

10. The method of claim 9, comprising:
obtaining at least one of the one or more index values from a received encoded signal; and
applying one or more transforms included in the second set of multiple transforms corresponding to the one or more index values instead of the first transform.

11. The method of claim 8, further comprising determining the second transform for replacing the first transform based on at least one of a shape and/or size of the block and/or a prediction mode.

12. The method of claim 11, wherein for a non-square block different transforms are applied for a horizontal dimension and a vertical dimension, the shortest of the horizontal dimension or the vertical dimension having a transform applied which is more suitable for a less correlated residual.

13. The method of claim 12, wherein the Haar transform or the Walsh-Hadamard transform is applied to the shortest of the horizontal dimension or the vertical dimension.

14. The method of claim 8, wherein for different block sizes different transforms having differing suitability for differently correlated residuals are applied and wherein below a predetermined transform size a transform is applied which is more suitable for a highly correlated residual.

15. The method of claim 14, wherein below the predetermined transform size the Slant transform is applied and above the predetermined transform size the Haar transform or the Walsh-Hadamard transform is applied.

16. The method of claim 8, wherein the second transform has a basis function including a discontinuity and/or constant increase or decrease.

17. An apparatus, comprising:
one or more processors configured to:
obtain a signal including image information including non-camera-captured image content;
determine a block of spatial-domain values for a prediction residual;
replace, based on information included in the signal, a first transform in a first set of multiple transforms with a second transform in a second set of multiple transforms for the non-camera-captured image content;
transform the block of spatial-domain values using the second transform; and
encode at least a portion of the image information based on the transform of the block of spatial-domain values,
wherein the second transform comprises one of a Haar transform, a Walsh-Hadamard transform, a Slant transform, or an identity transform.

18. The apparatus of claim 17, wherein the transforms included in the first set of multiple transforms and the second set of multiple transforms are defined based on one or more index values corresponding to entries in a table of transforms.

19. The apparatus of claim 17, wherein for different block sizes different transforms having differing suitability for differently correlated residuals are applied and below a predetermined transform size a transform is applied which is more suitable for a highly correlated residual.

20. The apparatus of claim 17, wherein the one or more processors are further configured to determine the second transform for replacing the first transform based on at least one of a shape and/or size of the block and/or a prediction mode.

21. The apparatus of claim 20, wherein below a predetermined transform size the Slant transform is applied and above the predetermined transform size the Haar transform or the Walsh-Hadamard transform is applied.

22. The apparatus of claim 20, wherein for a non-square block different transforms are applied for a horizontal dimension and a vertical dimension, the shortest of the horizontal dimension or the vertical dimension having a transform applied which is more suitable for a less correlated residual.

23. The apparatus of claim 22, wherein the Haar transform or the Walsh-Hadamard transform is applied to the shortest of the horizontal dimension or the vertical dimension.

24. An apparatus, comprising:
one or more processors configured to:
obtain a block of transform coefficients from a signal including encoded image information including non-camera-captured image content;
replace, based on information included in the signal, a first transform in a first set of multiple transforms with a second transform in a second set of multiple transforms for the non-camera-captured image content;
inverse transform the block of transform coefficients using said second transform; and
decode at least a portion of the encoded image information based on an inverse transform of the block of transform coefficients, wherein the second transform comprises one of a Haar transform, a Walsh-Hadamard transform, a Slant transform, or an identity transform.

25. The apparatus of claim 24, wherein the transforms included in the first set of multiple transforms and the second set of multiple transforms are defined based on one or more index values corresponding to entries in a table of transforms.

26. The apparatus of claim 25, wherein the one or more processors are further configured to:
obtain at least one of the one or more index values from a received encoded signal; and
apply one or more transforms included in the second set of multiple transforms corresponding to the one or more index values instead of the first transform.

27. The apparatus of claim 24, wherein the one or more processors are further configured to:
determine the second transform for replacing the first transform based on at least one of a shape and/or size of the block and/or a prediction mode.

28. The apparatus of claim 27, wherein for a non-square block different transforms are applied for a horizontal dimension and a vertical dimension, the shortest of the horizontal dimension or the vertical dimension having a transform applied which is more suitable for a less correlated residual.

29. The apparatus of claim 28, wherein the Haar transform or the Walsh-Hadamard transform is applied to the shortest of the horizontal dimension or the vertical dimension.

30. The apparatus of claim 24, wherein for different block sizes different transforms having differing suitability for differently correlated residuals are applied and wherein below a predetermined transform size a transform is applied which is more suitable for a highly correlated residual.

31. The apparatus of claim 30, wherein below the predetermined transform size the Slant transform is applied and above the predetermined transform size the Haar transform or the Walsh-Hadamard transform is applied.

32. The apparatus of claim 24, wherein the second transform has a basis function including a discontinuity and/or constant increase or decrease.

* * * * *